United States Patent
Knott et al.

(10) Patent No.: US 6,915,834 B2
(45) Date of Patent: *Jul. 12, 2005

(54) PROCESS FOR PRODUCING METAL FOAM AND METAL BODY PRODUCED USING THIS PROCESS

(75) Inventors: Wilfried Knott, Essen (DE); Benno Niedermann, Niederglatt (CH); Manfred Recksik, Essen (DE); Andreas Weier, Essen (DE)

(73) Assignees: Goldschmidt AG, Essen (DE); Buehler Druckguss AG, Uzwil (CH)

( * ) Notice: Subject to any disclaimer, the term of this patent is extended or adjusted under 35 U.S.C. 154(b) by 211 days.

This patent is subject to a terminal disclaimer.

(21) Appl. No.: 10/060,520

(22) Filed: Jan. 30, 2002

(65) Prior Publication Data

US 2002/0121157 A1 Sep. 5, 2002

(30) Foreign Application Priority Data

Feb. 1, 2001 (DE) .......... 101 04 339
Feb. 1, 2001 (DE) .......... 101 04 340

(51) Int. Cl.⁷ .......... B22D 27/00
(52) U.S. Cl. .......... 164/79; 164/113
(58) Field of Search .......... 164/113, 79

(56) References Cited

U.S. PATENT DOCUMENTS 5,972,285 A * 10/1999 Knott .......... 419/2

FOREIGN PATENT DOCUMENTS

| DE | 1164103 | 11/1960 | |
| DE | 195 01 508 C1 | 4/1996 | |
| DE | 197 44 300 A1 | 4/1998 | |
| DE | 198 327 94 C1 | 10/1999 | |
| EP | 0 461 052 B1 | 12/1991 | |
| EP | 0 666 784 B1 | 8/1995 | |
| EP | 0 804 982 A2 | 11/1997 | |
| GB | 892 934 | 4/1962 | |
| JP | 3 17236 | 1/1991 | |
| JP | 09241780 A * | 9/1997 | C22C/1/08 |
| JP | 9 241780 | 11/1997 | |
| WO | WO 92/21457 | 12/1992 | |

OTHER PUBLICATIONS

Dr. Ing. W. Thiele, "Füllstoffhaltiger Aluminium-schwamm–ein kompressibler Gusswerkstoff zur Absorption von Stossenergie", Metal Wissenschaftund Technik, pp. 39–42, Jan. 1974.

* cited by examiner

*Primary Examiner*—George Wyszomierski
*Assistant Examiner*—Janelle Morillo
(74) *Attorney, Agent, or Firm*—Frommer Lawrence & Haug LLP

(57) ABSTRACT

The invention relates to a process for producing metal foam and to a metal body produced using this process.

The object is achieved by a process for producing metal foam by adding a blowing agent to a metal melt, wherein the metal melt is introduced into the die cavity of a metal die-casting machine and is foamed using a blowing agent which releases gases and is solid at room temperature.

14 Claims, No Drawings

PROCESS FOR PRODUCING METAL FOAM AND METAL BODY PRODUCED USING THIS PROCESS

RELATED APPLICATION

This application claims priority to German application Nos. 101 04 339.2 and 101 04 340.6, filed Feb. 1, 2001, both herein incorporated by reference.

BACKGROUND OF THE INVENTION

1. Field of the Invention

The invention relates to a process for producing a metal foam in a metal die-casting machine, in particular for a producing metal foam from aluminum materials. This invention further provides for a metal body produced using this process; for example, a component made from an aluminum material of this type.

2. Discussion of the Related Art

It is known to produce components from foamed metallic materials. These components are distinguished by inter alia a lightweight structure, rigidity, compressive strength improved mechanical and acoustic damping. By way of example, cast cores of aluminum foam are surrounded with an aluminum material by casting or are inserted as shaped parts into a component The sheath and core or shaped part are produced separately and are then joined to one another. In addition to the high manufacturing outlay, this also leads to a low manufacturing quality.

The basis of foamable semifinished aluminum products is atomized aluminum powder to which a blowing agent is added. By way of example, according to DE-A-197 44 300, a body which has been pressed from a powder mixture is heated, in a heatable, closed vessel, to temperatures which are higher than the decomposition temperature of the blowing agent and/or the melting temperature of the metal.

The powder is compressed and the shaped part produced in this way is inserted into the area of a component, which is to be foamed. The powder is foamed by being heated to up to 650° C. In the process, the "sheath" may be subject to unacceptable deformation or the foaming operation may take place non-uniformly.

Sintering of metallic hollow beads or infiltration of metal melts into cores or filler bodies, which are removed after solidification of the melt, is also possible.

According to a process described in JP-A-03017236, metallic articles with cavities are produced by dissolving gases in a metal melt and initiating the foaming operation by suddenly reducing the pressure. The foam is stabilized by cooling of the melt.

According to the teaching given in JP-A-09241780, metallic foam is obtained with the controlled release of blowing gases as a result of a metal initially being melted at temperatures which lie below the decomposition temperature of the blowing agent used. Subsequent dispersion of the blowing agent in the molten metal and heating of the matrix to above the temperature which is then required to release blowing gases leads to a metal foam being formed.

W. Thiele: Füllstoffhaltiger Alumumschwamm—ein kompressibler Gusswerkstoff zur Absorption von Stoßenergie, [Filler-containing aluminum sponge—a compressible cast material for absorption of impact energy], in: Metall, 28, 1974, Vol. 1, pp. 39 to 42, describes the production of foamed aluminum. The desired cavities are predetermined in terms of size, shape and position in the form of a loose bed of readily compressible, inorganic light materials, such as for example expanded clay minerals, expanded clay, glass foam beads or hollow corundum beads, etc. The bed of light material is introduced into a die. The spaces which remain in the bed are filled with metal. The aluminum sponge obtained in this way has relatively poor mechanical qualities and contains the materials of the bed.

DE-B-11 64 103 describes a process for producing metal foam bodies. In this process, a solid material which, when heated, decomposes to form gases, is mixed with a molten metal in such a manner that the solid material is wetted by the metal. By way of example, pulverulent titanium hydride is added to a molten alloy of aluminum and magnesium at a temperature of 600° C. The closed foam formed in this way is then cast into a die, where it can cool and solidify. In this case too, it is clearly not a closed system, but rather an open system which is used.

GB-A 892934 describes the production of complex structures with foamed metal core and closed, nonporous surface, the execution of the described process being dependent on the introduction of the metal/blowing agent mixture into the die before the start of the foaming process.

DE-C 198 32 794 describes a process for producing a hollow profiled section which is filled with metal foam. This process comprises the steps of extruding the hollow profiled section from a sheathing material using an extruder that has an extrusion die with a die part and a mandrel, supplying the metal foam from a foam material to the hollow profiled section through a feed duct, which is formed in the mandrel.

The casting of metal parts with lost foam is already known in accordance with EP-B 0 461 052. WO 92/21457 describes the production of aluminum foam in such a manner that gas is blown in under the surface of a molten metal with abrasives being used as stabilizers.

EP-B 0 666 784 describes a process for the shape casting of a metal foam which is stabilized by means of particles, in particular an aluminum alloy, by heating a composite of a metal matrix and finely divided solid stabilizer particles above the solidus temperature of the metal matrix and discharging gas bubbles into the molten metal composite below the surface thereof to form a stabilized liquid foam on the surface of the molten metal composite. The characterizing feature is shape casting of the metal foam by the stabilized, liquid foam being pressed into a mold, using a pressure which is just sufficient for the liquid foam to adopt the shape of the mold, without the cells of the foam being significantly compressed, and then cooling and solidifying the foam, in order to obtain a shaped object. The foam is in this case pressed into the mold by means of a moveable plate. A first moveable plate presses the liquid foam into the mold and a smooth surface is formed on the shaped foam object. In order to form smooth inner surfaces on the foam object, a second moveable plate is pressed into the foam inside the mold. However, the shaping may also take place by means of rollers.

A further process for making castings from metal foam is described in EP-A 0 804 982. In this case, the foaming takes place in a heatable chamber outside a casting mold, the volume of the powder metallurgy starting material introduced into the chamber for the metal foam, in its phase in which it has been foamed with the entire foaming capacity, substantially corresponding to the volume of a filled mold. All the metal foam in the chamber is pressed into the mold, in which foaming with the remaining foaming capacity is continued until the mold has been completely filled. The mold is a sand or ceramic mold, the metal foam is inserted into the chamber as a semifinished product and is only pressed into the mold, for example by means of a piston, after the initial foaming. When the foam is being pressed into the mold, it is sheared. The mold is not filled with a foam with a structure which is deliberately inhomogeneous.

DE-A 19 501 508 discloses a process for producing a hollow profiled section of reduced weight and increased rigidity, for example a component for the chassis of a motor vehicle. It comprises die-cast aluminum, in the cavities of which there is a core of aluminum foam. The integrated foam core is produced by powder metallurgy and is then fixed to the inner wall of a casting die and surrounded with metal by die-casting.

The dissolving or blowing of blowing gases into metal melts is not suitable for the production of near net shape components, since a system comprising melt with occluded gas bubbles is not stable for a sufficient time for it to be processed in shaping dies.

OBJECT OF THE INVENTION

Therefore, it is an object of the invention to provide a simple method for producing metal foam which is suitable for mass production and allows near net shape metal bodies to be produced with little outlay.

SUMMARY OF THE INVENTION

The solution to the above object consists, in a first embodiment, in a process for producing metal foam by adding a blowing agent to a metal melt, wherein the metal melt is introduced into the die cavity of a metal die-casting machine and is foamed using a blowing agent which releases gases and is solid at room temperature.

DETAILED DISCUSSION OF THE INVENTION

Surprisingly, it has been discovered that, in particular, light-metal foams, for example comprising aluminum or aluminum alloys, can be produced as integral foams, i.e. with a closed outer skin, in a targeted manner as a gradient material and near net shape in one step by means of a casting operation, using a commercially available die-casting machine, based on the use of solid, gas-releasing blowing agents, for example a metal hydride, in particular a light metal hydride.

During die-casting in the sense of the present invention, liquid or pasty metal is forced at high pressure into a die which forms the die cavity. In the case of the hot-chamber process, the metal is injected directly from the melting pot at up to approx. $10^7$ Pa into the die. In the cold-chamber process, which is preferred according to the invention, for example for materials comprising Al alloys and Mg alloys, the molten material is first pressed into a cold intermediate chamber and, from there, is pressed into the die at more than $10^8$ Pa. The casting performance of the hot-chamber process is higher, but so is the wear to the installation. The benefits of die-casting are the good strength of the material, the clean surface, the high dimensional accuracy, the low wall thicknesses required, the possibility of forming castings of complex shape and the high working rate. These advantages can be further improved by subatmospheric pressure (vacuum) in the die. Commercially available, real-time controlled die-casting machines can advantageously be used in this process.

In a preferred embodiment of the present invention, the metals are selected from nonferrous metals and base metals, in particular selected from magnesium, calcium, aluminum, silicon, titanium or zinc and the alloys thereof On the other hand, ferrous metals and precious metals can also be foamed with the aid of the present invention. Where the present invention uses the term alloy, this term is to be understood as meaning that the alloy contains at least about 30% by weight of the metal mentioned.

The process sequence, which is preferred according to the invention, comprises the step of introducing the required volume of metal melt into the shot sleeve or chamber and transferring it into a die cavity with the blowing agent being added to the metal melt In a preferred embodiment, metal melt and blowing agent are brought together in the die cavity with the die being filled or underfilled by a defined volume of the melt/blowing agent mixture.

In a further preferred embodiment, the blowing agent is brought into contact with the metal melt not directly in the die cavity, but rather in a shot sleeve or chamber, and the mixture is then introduced into the die cavity.

The introduction of the blowing agent into the shot sleeve or chamber, on the one hand, and/or the die cavity, on the other hand, may take place before, during and/or after the introduction of the metal melt into the chamber in question. There is no need for a special mixing operation when the metal melt and blowing agent are brought together. Rather, in the process according to the invention, mixing is effected by the introduction of the metal melt into the die chamber, which in the die-casting machine takes place at a high velocity, irrespective of the time at which the blowing agent is added to the metal melt.

However, for the present invention it is important for the foaming caused by the release of gases from the blowing agent substantially to take place only in the die cavity.

The foaming itself takes place in the die cavity, which represents a closed die. However, it may have risers for venting, as is customary in die-casting or the like. Then, the substantially foamed metal body is ejected.

In a further configuration, the blowing agent is added to the metal melt directly in the shot sleeve or chamber or in the die cavity, with integrally foamed metal bodies being produced in each case in one working step. These bodies have a smooth surface, the formation of which is readily reproducible. Different wall thicknesses are easy to establish on account of the possibility of spray filling. The walls are closed on all sides, are clean, nonporous and homogeneous. Further machinery is not generally required. Toward the inside, the metal bodies produced are increasingly porous and have a density gradient.

In terms of its decomposition temperature, the blowing agent should be adapted to the melting temperature of the casting material (metal melt). The decomposition must only commence at over 100° C. and should be no more than approximately 150° C. higher than the melting temperature.

The quantity of blowing agent to be used depends on the required conditions. Within the context of the present invention, it is particularly preferable for the blowing agent to be used in a quantity of from about 0.1 to about 10% by weight, in particular about 0.2 to about 1% by weight, based on the metal melt.

Blowing agents which release gases and are solid at room temperature include, in particular, light-metal hydrides, such as magnesium hydride. In the context of the present invention, autocatalytically produced magnesium hydride, which is marketed, for example, under the name TEGO Magnan by the applicant, is particularly preferred within the context of the present invention. However, titanium hydride, carbonates, hydrates and/or volatile substances, which have already been used in the prior art to foam metals, can also be used in the same way.

Based on solid material, the proportion of metal in the metal body produced may be in the range from about 5 to about 95% by volume or % by weight, depending on the volume or thickness of the metal body, a lower volume to area ratio meaning higher degrees of filling.

The invention is described in more detail below in an exemplary embodiment

EXAMPLES

A vehicle component made from an aluminum material was to be produced as an integrally foamed metal body using a commercially available die-casting machine, for example a die-casting machine belonging to the Evolution series from Bühler Druckguss AG. For this purpose, a shot chamber of the die-casting machine was filled with a corresponding quantity of metal melt. Magnesium hydride in powder form was added to the liquid metal as the blowing agent in the closed shot chamber. Almost at the same time, the mixture of blowing agent and metal melt began to be forced quickly into the die cavity. The die cavity was underfilled with a defined volume. The turbulence produced led to intimate mixing in the die cavity and to foaming. The metal solidified on the die walls and formed a nonporous, homogeneous wall of the metal body, it was possible to set both the wall thicknesses and the porosity and its gradient by varying process parameters.

The "shot" took place before the formation of the foam; the foaming process took place in situ in the die cavity. The melt was quickly foamed into the cold die. The component had a mass of only approximately 40% compared to conventional die castings.

Although the metal body produced according to the example from an aluminum material had a lower density than magnesium, its torsional rigidity was approximately the same.

The above description is intended to be illustrative and not limiting. Various changes and modifications in the embodiment described herein may occur to those skilled in the art. Those changes can be made without departing from the scope and spirit of the invention.

What is claimed is:

1. A process for producing an aluminum or an aluminum alloy metal foam in a die-casting machine comprising a shot-sleeve and a die cavity which comprises:

a die-casting step comprising
(a) introducing at high pressure an aluminum or an aluminum alloy metal melt into the shot sleeve and transferring said melt to the die cavity; and
(b) mixing magnesium hydride as a blowing agent with the aluminium or aluminium alloy metal melt wherein the magnesium hydride is introduced with the aluminium or aluminium alloy metal into the shot sleeve or is introduced directly into the die cavity; and
(ii) wherein foaming of the mixture of the aluminium or aluminium alloy metal and magnesium hydride takes place in the die cavity.

2. The process according to claim 1, wherein the mixture comprising the aluminum or an aluminum alloy metal melt and the blowing agent is formed by introducing the aluminum or an aluminum alloy metal melt and the blowing agent into the die cavity at the same time.

3. The process according to claim 1, wherein the mixture comprising the aluminum or an aluminum alloy metal melt and the blowing agent is formed before introducing the mixture to the die cavity.

4. The process according to claim 3, wherein the mixture comprising the aluminum or an aluminum alloy metal melt and the blowing agent is formed in the shot-sleeve and is then introduced to the die cavity.

5. The process according to claim 1, wherein the die cavity is filled with the mixture comprising the aluminum or an aluminum alloy metal melt and the blowing agent before foaming said mixture.

6. The process according to claim 1, wherein the die cavity is underfilled by a defined volume.

7. The process according to claim 1, wherein the process is a cold-chamber process.

8. The process according to claim 1, wherein the process is a hot-chamber process.

9. The process according to claim 1 wherein, the amount of magnesium hydride used is from about 0.01 to about 10% by weight, based on the aluminum or an aluminum alloy metal melt.

10. The process according to claim 9, wherein the amount of blowing agent is from 0.01 to 10% by weight, based upon metal melt.

11. The process according to claim 9, wherein the amount of blowing agent is from about 0.1 to about 10% by weight based upon metal melt.

12. The process according to claim 1, wherein the magnesium hydride is autocatalytically produced.

13. A process for producing an aluminum or an aluminum alloy metal foam in a die-casting machine comprising a shot-sleeve and a die cavity which comprises foaming a mixture comprising an aluminum or an aluminum alloy metal melt and magnesium hydride as a blowing agent in the die cavity at a pressure at or greater than approximately $10^7$ Pa.

14. The process according to claim 13 wherein the pressure is between $10^7$ Pa to $10^8$ Pa.

* * * * *